March 11, 1930.　　　　H. F. LAKE　　　　1,749,951
STRUCTURAL DESIGN FOR AIRCRAFT
Filed Dec. 1, 1928　　　5 Sheets-Sheet 1
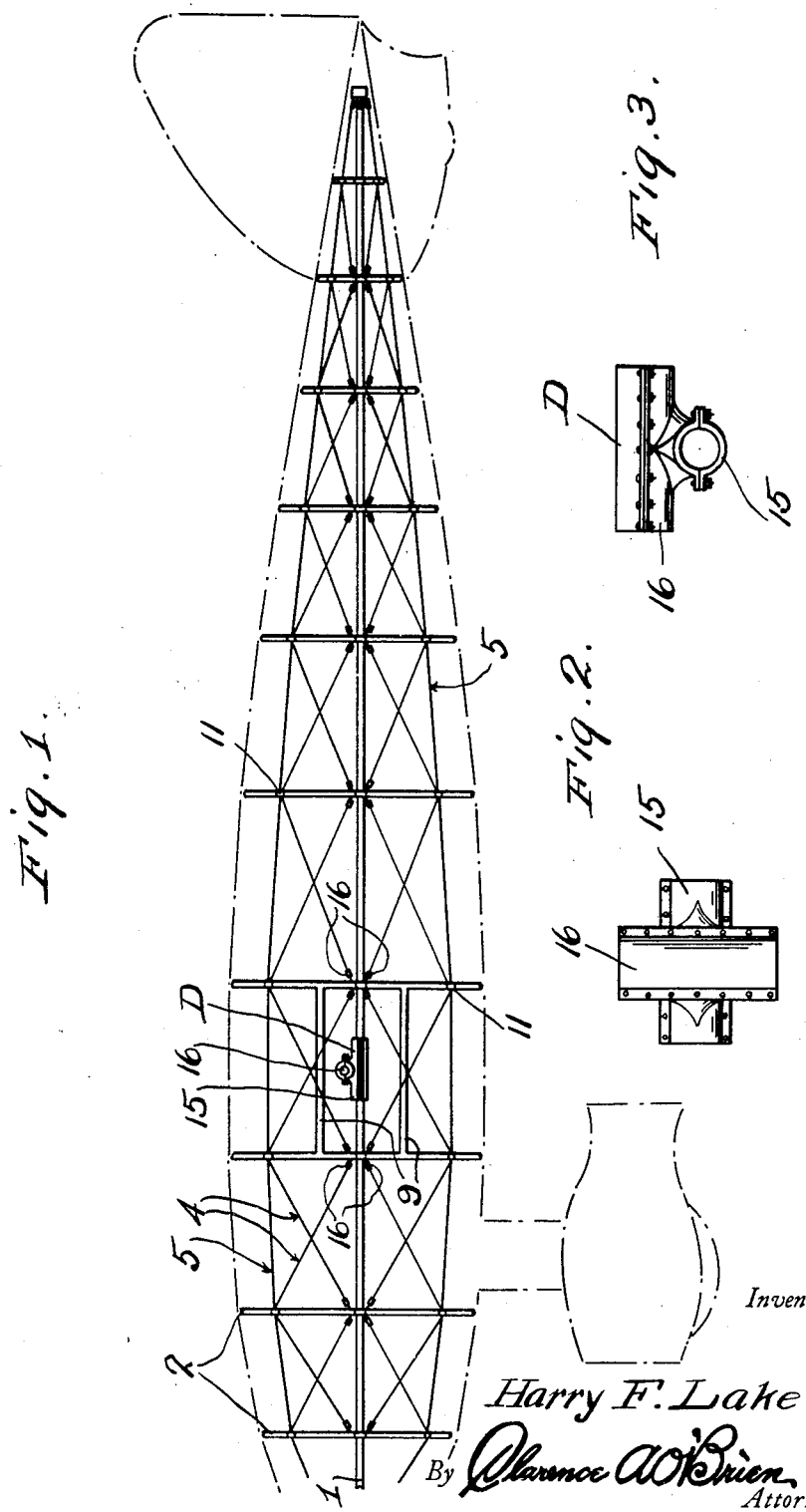
Inventor
Harry F. Lake
By Clarence A. O'Brien
Attorney

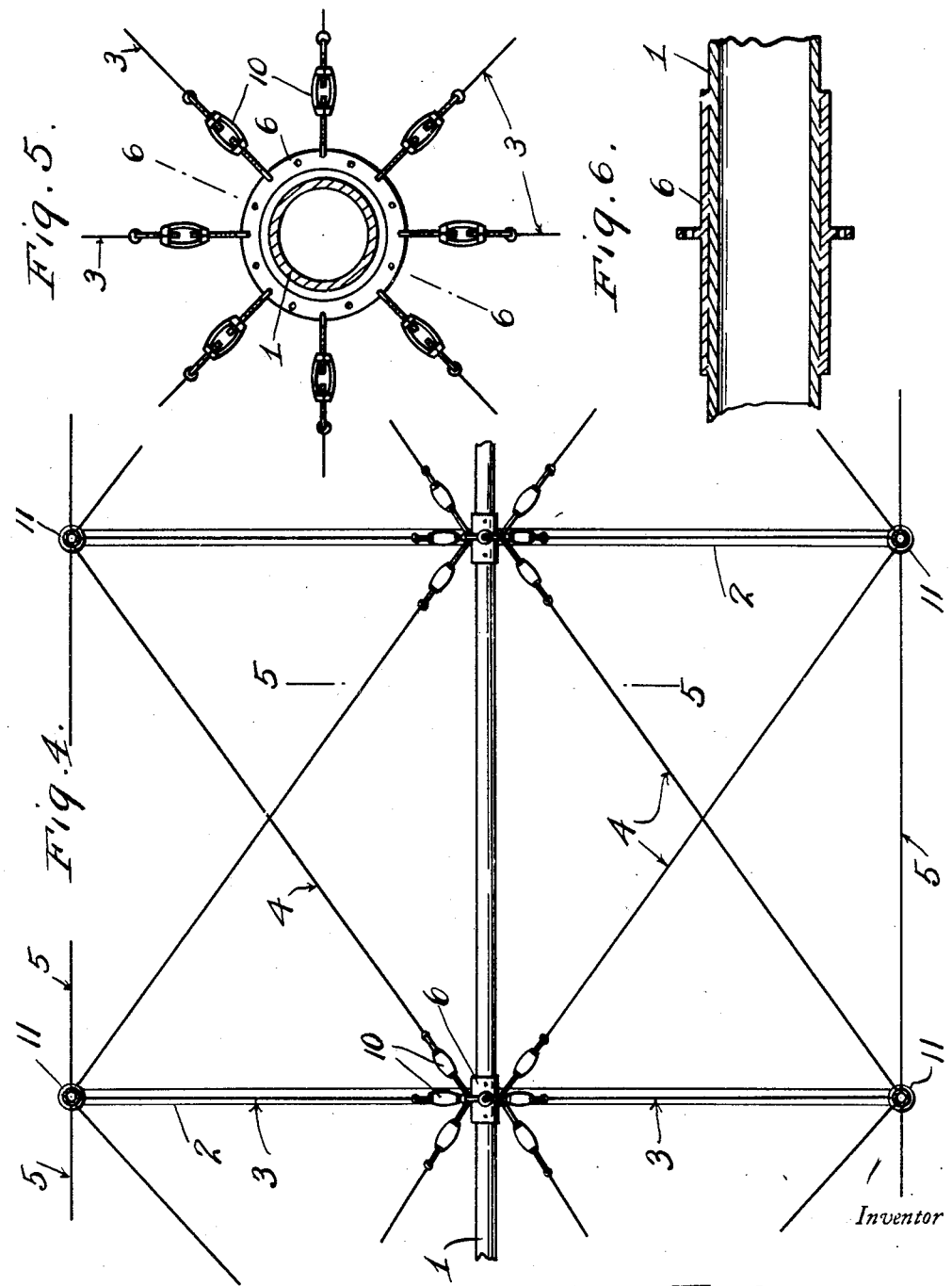

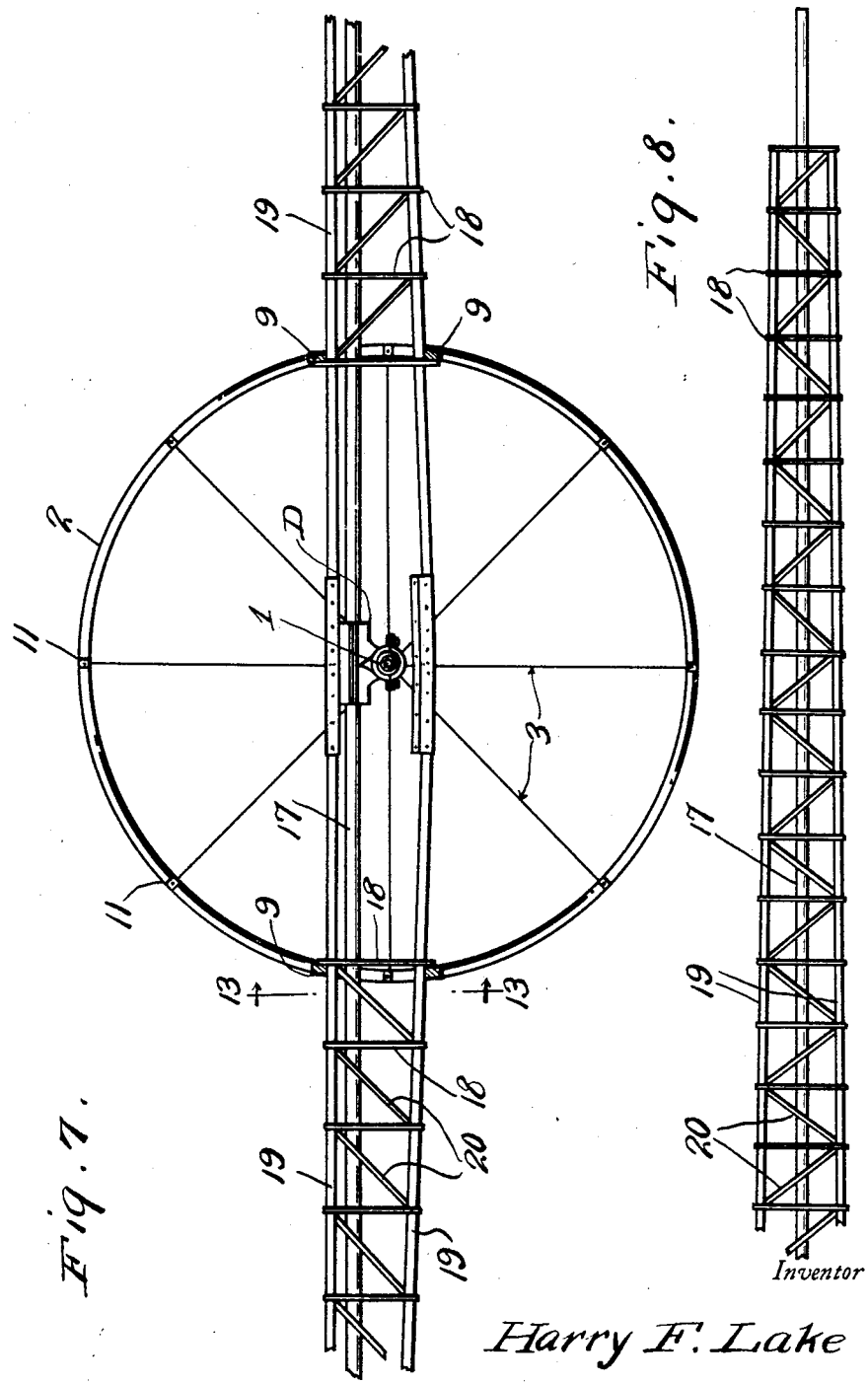

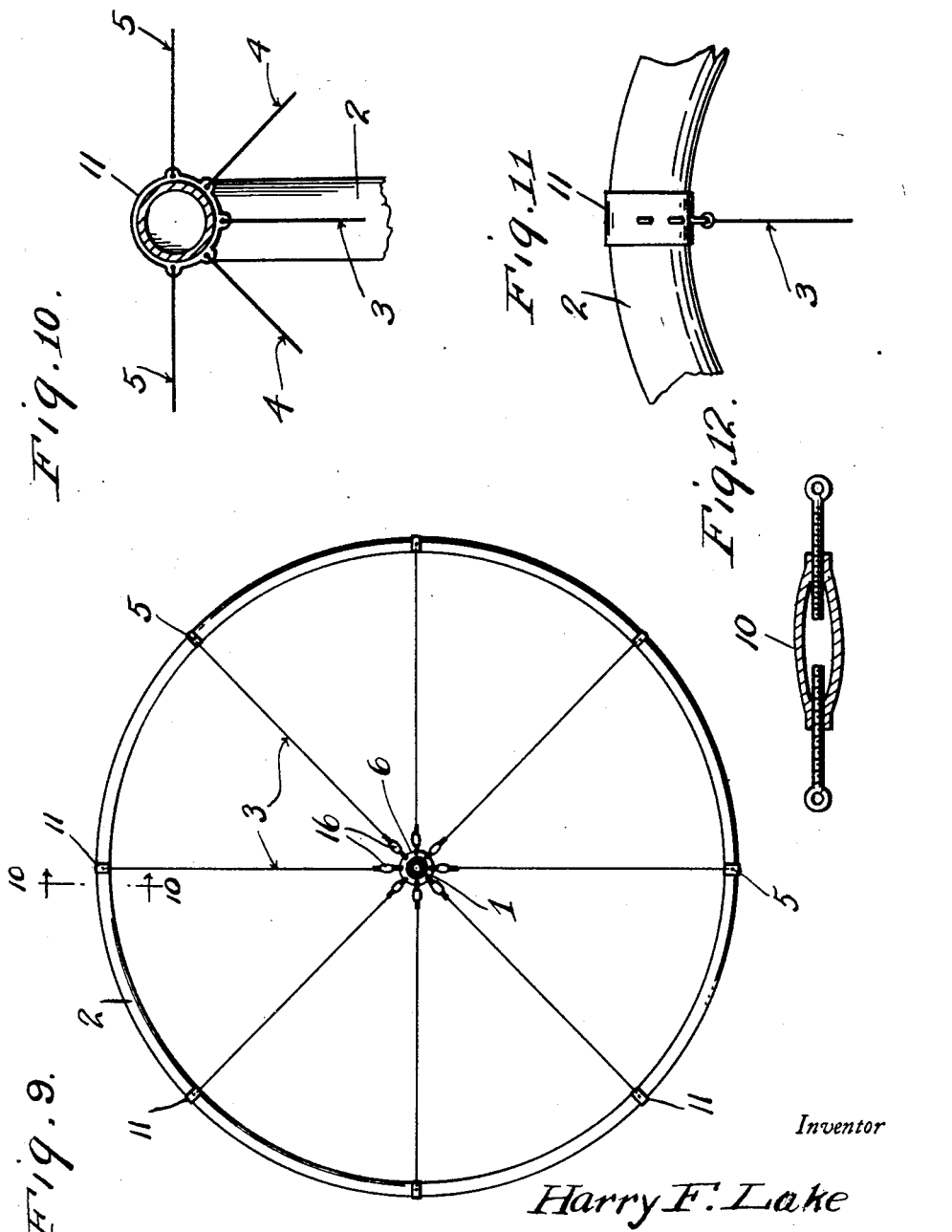

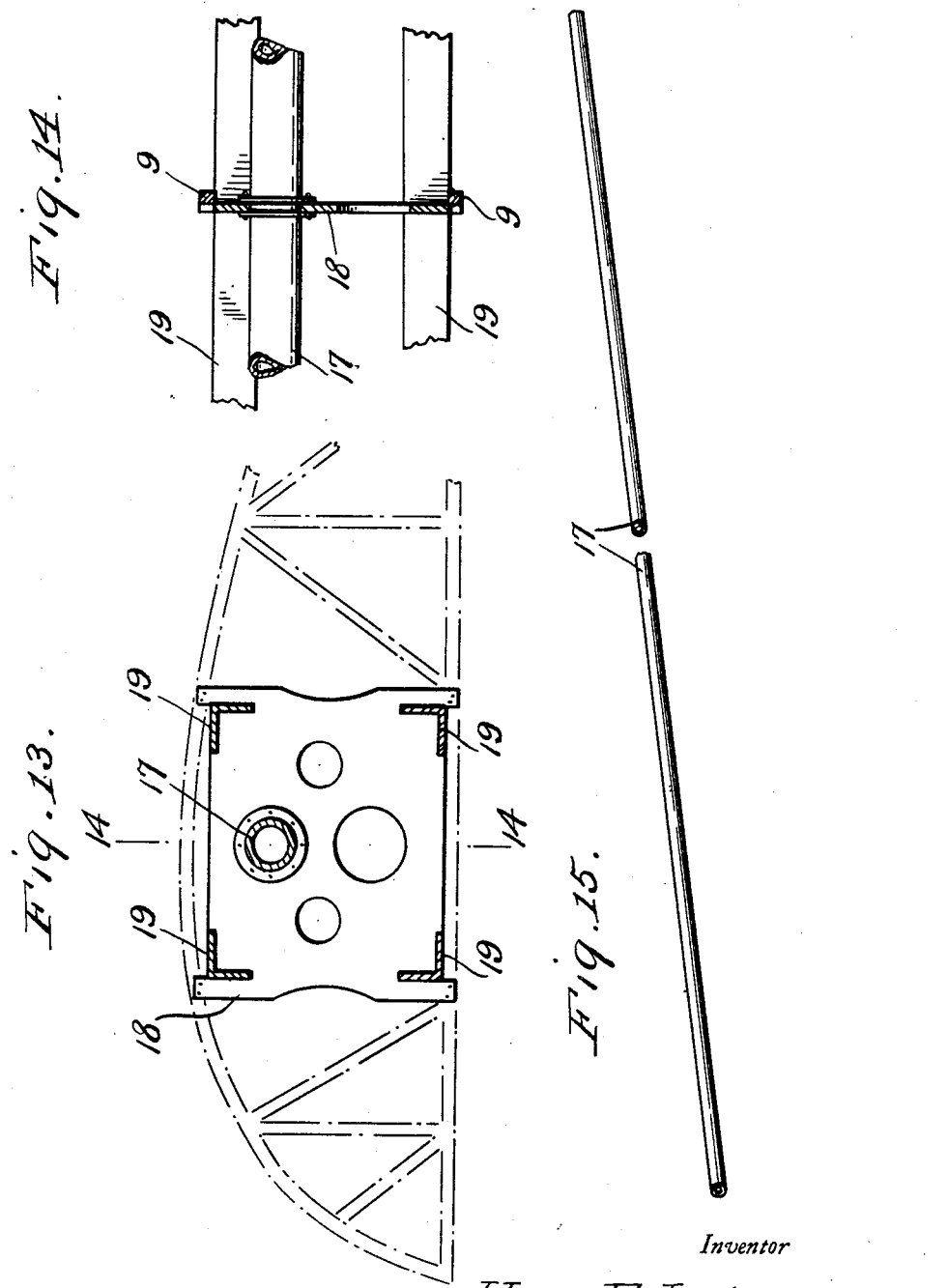

Patented Mar. 11, 1930

1,749,951

UNITED STATES PATENT OFFICE

HARRY F. LAKE, OF VIROQUA, WISCONSIN

STRUCTURAL DESIGN FOR AIRCRAFT

Application filed December 1, 1928. Serial No. 323,033.

The present invention relates to a novel structural design for aircraft and the objects and advantages of the invention will be apparent from a consideration of the following description taken in conjunction with the accompanying drawings, wherein:

Figure 1 is a side elevation of the fuselage structure,

Figure 2 is a top plan view of a casting to connect the wing spars with the torque tube, Figure 3 is a side elevation thereof, Figure 4 is an enlarged detail fragmentary longitudinal section through the fuselage structure, Figure 5 is a detail transverse section taken substantially on the line 5—5 of Figure 4, Figure 6 is a detail section taken substantially on the line 6—6 of Figure 5, Figure 7 is a transverse section through the fuselage structure showing the wing structures fragmentarily, Figure 8 is a side elevation of one of the wing structures, Figure 9 is a transverse section through the fuselage structure, Figure 10 is an enlarged detail section taken substantially on the line 10—10 of Figure 9, Figure 11 is an elevation of the structure shown in Figure 10, Figure 12 is a detail section through one of the turn buckles, Figure 13 is an enlarged detail section taken substantially on the line 13—13 of Figure 7, Figure 14 is a detail section taken substantially on the line 14—14 of Figure 13, and Figure 15 is a perspective view of one of the wing spars.

Referring to the drawing in detail, it will be seen that the numeral 1 denotes the torque tube which may be square or round in cross section, a built up girder, angle or any other type of conventional member extending through the longitudinal center of the structure.

Hoops 2 are disposed about the tube 1 and may be round, hexagon, or any similar shape that may be used to conform to the desired construction. Any suitable material may be used for these hoops. Numerals 3 denote tension members which may be offset, staggered, crossed or straight and they may be constructed of cable, wire, tubing or any other suitable material.

Numerals 4 denote diagonal tension members which may be staggered at any degree using suitable material such as wire, cane, etc. Numerals 5 denote longitudinal tension members which may be constructed of cable, wire, tubing, etc.

Collars 6 support the tension members 3 and 4 on the torque tube and may be cast in any suitable shape to conform to the particular material used.

Turn buckles 10 are incorporated in the tension members 3 and 4. Fittings 11 are mounted on the hoops 2 in order that the tension members 3, 4 and 5 may be connected thereto. Numerals 9 denote members to support the wing spars at the outer extremity of the fuselage to provide additional braces.

These members 9 are disposed between a pair of adjacent hoops. A casting D includes the sleeve portion 15 to receive the torque tube 1 and a sleeve portion 16 at right angles to the portion 15 for receiving the wing spars.

The wing spars are denoted by numerals 17. Bulk heads 18 are fastened to members 9 and the spars 17 extend therethrough laterally and outwardly of the fuselage structure. Angle bars 19 extend from the corners of the bulk heads.

There are preferably a plurality of these bulk heads 18 for each wing and the inner one only, of course, is attached to the members 9 and the others are disposed at spaced intervals and braced in respect to each other as is indicated at 20.

It will be obvious that the fuselage structure described may be used in lighter than air craft as the rigid construction of stream line gas bags.

The fuselage structure provides lighter weight by replacing compression members with tension members and the weight is greatly reduced without sacrificing the safety factor. The torque tube through the center of the structure prevents torsion when under severe strain. This gives the empennage or tail surface greater rigidity which results in better control under difficult conditions.

As the wing spar acts as a single spar in regard to lift, the center of lift and the center of gravity coincide at all angles of flight making perfect balance. This type of fuselage construction lends itself to ideal stream line forms.

It develops direct line of thrust because the torque tube coincides with the line of thrust, hence, as the center of gravity is located on the torque tubes, the line of thrust passes through the center of gravity directly.

The type of wing spar construction provides for greater strength since practically three spars with the advantage of a single spar in regard to lift is the result. Torsion is eliminated in the wings because the torque tube successfully eliminates the torsion present in all other types of wing spars.

Extension of the torque tube permits the use of a flat valve aileron or adjusting angle of attack of wing tip. The structure is self alining because the type of fitting used at the inner section of the wing spar and the fuselage torque tube secures automatic alinement.

I have not thought it necessary to describe the ribs and other features incident to the completion of the wing structure but have indicated how this may be accomplished in Figure 13 in dotted lines.

It is thought that the construction, utility and advantages of this invention may now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A structure of the class described including a torque tube, hoops disposed about the torque tube at spaced intervals, radial tension members between the hoops and the torque tube, diagonal tension members between the torque tube and the hoops, a member including a sleeve to receive the torque tube and a second sleeve disposed transversely of the first sleeve, spars in the second sleeve extending laterally from the torque tube.

2. A structure of the class described including a torque tube, hoops disposed about the torque tube at spaced intervals, radial tension members between the hoops and the torque tube, diagonal tension members between the torque tube and the hoops, a member including a sleeve to receive the torque tube and a second sleeve disposed transversely of the first sleeve, spars in the second sleeve extending laterally from the torque tube, a plurality of bulk heads having openings to receive the spars and angle members attached to the corners of the bulk heads.

3. A structure of the class described including a torque tube, hoops disposed about the torque tube at spaced intervals, radial tension members between the hoops and the torque tube, diagonal tension members between the torque tube and the hoops, a member including a sleeve to receive the torque tube and a second sleeve disposed transversely of the first sleeve, spars in the second sleeve extending laterally from the torque tube, a plurality of bulk heads having openings to receive the spars and angle members attached to the corners of the bulk heads, a pair of brace members between a pair of intermediate hoops on each side of the torque tube to which the innermost bulk heads are attached.

4. A structure described including a torque member, hoops disposed about the torque member at spaced intervals, radial tension members between the hoops and the torque member, diagonal tension members between the torque member and the hoops, longitudinal brace members between the hoops, a member including a sleeve to receive the torque member, and a second sleeve disposed transversely of the first sleeve, bars in the second sleeve extending laterally from the torque tube.

5. A structure described including a torque member, hoops disposed about the torque member at spaced intervals, radial tension members between the hoops and the torque member, diagonal tension members between the torque member and the hoops, longitudinal brace members between the hoops, a member including a sleeve to receive the torque member, and a second sleeve disposed transversely of the first sleeve, bars in the second sleeve extending laterally from the torque tube, and turn buckles in the radial tension members.

6. A structure described including a torque member, hoops disposed about the torque member at spaced intervals, radial tension members between the hoops and the torque member, diagonal tension members between the torque member and the hoops, longitudinal brace members between the hoops, a member including a sleeve to receive the torque member, and a second sleeve disposed transversely of the first sleeve, bars in the second sleeve extending laterally from the torque tube, and turn buckles in the radial tension members, a plurality of bolt heads having openings to receive the bars and angle members attached to the corners of the bulk head.

7. A structure described including a torque member, hoops disposed about the torque member at spaced intervals, radial tension members between the hoops and the torque member, diagonal tension members between the torque member and the hoops, longitudinal brace members between the hoops, a member including a sleeve to receive the torque member, and a second sleeve disposed transversely of the first sleeve, bars in the second sleeve extending laterally from the torque tube, and turn buckles in the radial tension members, a plurality of bolt heads having openings to receive the bars and angle members attached to the corners of the bulk head, a pair of brace members between a pair of intermediate hoops on each side of the torque members to which the innermost bolt heads are attached.

In testimony whereof I affix my signature.

HARRY F. LAKE.